June 10, 1969  W. C. HALL ET AL  3,448,859
RADIOACTIVE WASTE REMOVAL METHOD
Filed April 8, 1966
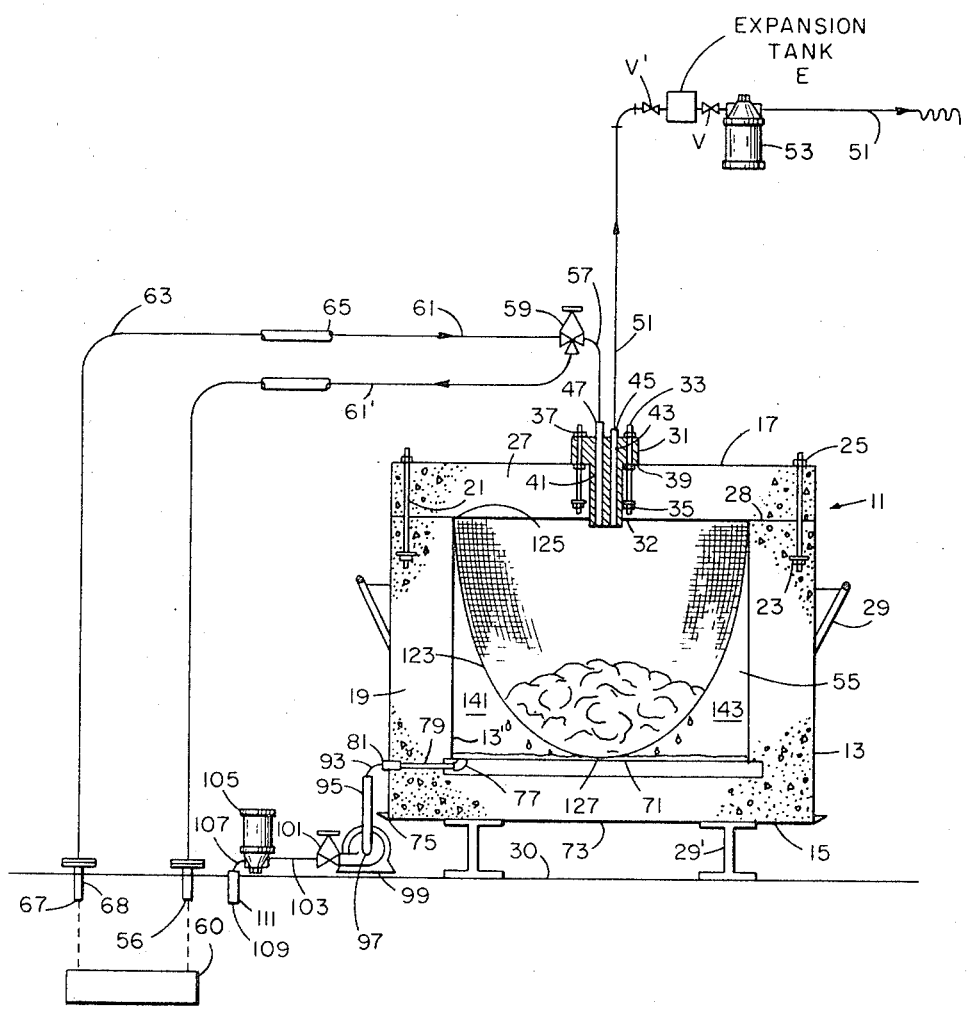
INVENTORS.
THEODORE R. BARKER, II
WILLIAM C. HALL
LEIGH D. HASSELL, JR.

United States Patent Office 3,448,859
Patented June 10, 1969

1

3,448,859
RADIOACTIVE WASTE REMOVAL METHOD
William C. Hall, Baltimore, Theodore R. Barker II, Pasadena, and Leigh D. Hassell, Jr., Baltimore, Md., assignors, by mesne assignments, to the United States of America as represented by the United States Atomic Energy Commission
Filed Apr. 8, 1966, Ser. No. 541,400
Int. Cl. B01d 37/00; C02b 1/40
U.S. Cl. 210—66     3 Claims

ABSTRACT OF THE DISCLOSURE

Method of preparing a closed package of solid, low level, radioactive waste for shipment wherein a particular reusable shipping cask is loaded from a closed system with a dryable, liquid-solid mixture of radioactive waste, and the waste is partially dried in the cask by a paraboloid screen filter under suction pressure provided by another closed system and finish dried with a desiccant that fills the cask and underlies and overlies the waste at the center of the cask.

---

This invention relates to shipping methods and more particularly to shipping methods for the removal of radioactive waste products. The invention described herein was made in the course of, or under a contract with the U.S. Atomic Energy Commission.

In many nuclear reactor operations it is desirable to collect and remove radioactive waste products. In portable reactors, for example, normal operations may cause the generation and accumulation of sizeable amounts of wastes that are impossible or impractical to dispose of locally. Various methods and apparatus have been made and used for this waste removal but these means have been unsuccessful, hazardous, inefficient or impractical since they have required mixing, either with concrete, which has been costly, bulky, heavy and time consuming or mixing as a liquid for shipment, which has caused splashing and local loss, or has been hazardous, costly or otherwise inefficient. It is additionally desirable to provide a reusable storage and shipping cask having a high capacity and light weight, compact shipping unit size.

It is an object of this invention, therefore, to provide a practical and efficient radioactive waste removal method by providing for the retention and shipment of only the solid wastes.

It is a further object of this invention to provide an improved method of operating a nuclear reactor and of removing radioactive wastes therefrom.

In accordance with this invention there is provided a method for the removal of radioactive wastes from liquid cooled reactors in which the coolant is used to remove the reactor heat in a Carnot heat cycle. The method and construction involved in this invention utilize standard and well-known techniques and apparatus and are highly flexible for a wide range of applications, waste products, and reactors. More particularly, this invention involves the use of a reusable shipping cask having a concrete-shielded, steel-wall container with removable lid and inner filter basket forming a cavity into which is pumped a resin water mixture from the reactor coolant purification system whereby the solids are retained by the baskets and the fluids are pumped back for reprocessing. With

2 the proper selection of basket, filling of the basket and subsequent blowing of desiccant into the open spaces to absorb residual moisture, the cask can be properly sealed and shipped; at a terminal point, the basket can be removed for burial and by installation of a new basket the cask can be returned for reuse.

The above and further novel features of this invention will appear more fully from the following detailed description when the same is read in connection with the accompanying drawing. It is expressly understood, however, that the drawings are not intended as a definition of the invention but are for the purpose of illustration only.

In the drawing there is shown a partial schematic view of the method and apparatus of this invention.

A cask of this design is particularly adapted for use in the removal of radioactive wastes from reactors wherein the wastes are spent ion-exchange resins, which are highly contaminated by corrosion or fission products from the reactor coolant purification system and the residual bottoms from the waste processing evaporator. Such reactor systems include portable reactors but this invention is likewise useful in radioactive waste removal from any other system where radioactive contaminants are contained in a liquid and can be or are normally introduced into ion-exchange resin.

The cask 11 comprises a hollow concrete-shielded steel wall container shell 13 having a circular cylindrical shape with closed end 15 and an opposite removable, selectively closeable lid 17. High density concrete 19 with a steel inner liner 13' provides a durable, thick radiation resistant shield having an inside and outside shape corresponding to the shape of the steel shell 13. Suitable tie bolts 21, having nuts 23 embedded in the concrete 19 and hold down nuts 25 that turn down on bolts 21, hold lid 17 with its concrete of high density internal liner section 27 tightly closed along flat smooth sealing surfaces 28. Lifting lugs 29 on the outside of shell 13 provide means for lifting the cask 11 for removal and transport or resting on supporting girders 29' on primary building floor 30.

The cask top piping system is closed to the release of fluids therefrom, and to this end has a filler plug 31 imbedded in the top of lid 17 and passing through hole 32 in the lid section. Holddown bolts 33, having suitable nuts 35 imbedded in the concrete of lid 17 and nuts 37 that turn down on bolts 33, hold the plug 31 securely in place along opposing, flat, smooth sealing surfaces 39 in lid 17. Passages 41 and 43 in plug 31 have male threaded inserts 45 and 47 which receive the vent and fill pipes 51 and 57. The turning down of nuts 37 on bolts 33 also deflects the plug 31 into sealing contact with the lid 17 and its concrete liner 27 along opposing, flat, smooth sealing surfaces 39. Pipe 51 threads onto insert 45 at one end and into particulate filter 53 at the other end to connect the inside of cavity 55 in cask 11 with a remote primary expansion tank E having alternately openable valves V' and V and vent pipe 51 that is closed to the release of gas, fluids or solids from the tank E therethrough due to filter 53 and the long length, large volume, height and serpentine nature of pipe 51. Additionally, pipe 57 threads to insert 47 at one end and into regulator bypass valve 59 at the other end to communicate cavity 55 therewith. The valve 59 in one position, communicates the inside of pipe 63 and transfer pump discharge pipe 68 with opening 56 of a storage tank 60 through pipes 61 and 63 having a high pressure metal hose coupling 65. The valve 59 in its other position, communicates the inside of pipe 57 and cavity 55 with opening 67 of the transfer pump discharge 68.

The cask bottom piping system is also closed to the release of fluids therefrom, and to this end comprises a flat plate 71 parallel with the bottom 73 of cask 11 so that the leveling of bottom 73 levels plate 71. Likewise the adjustment of bottom 73 to provide a low point 75 at the edge of bottom 73 lowers pipe elbow 77 so that all liquid caught on plate 71 drains into this elbow 77. Thereupon, this liquid passes through pipe nipple 79 imbedded in concrete 19, coupling 81 threaded into nipple 79, transparent pipe 95 threaded into elbow 93 and intake 97 of return pump 99. The return pump 99 pumps the filtered liquid through shutoff valve 101 when open, through pipe 103, particulate filter 105, elbow 107 and opening 109 in sump tank return 111. The transfer pump takes suction from the storage tank. The transfer pump discharge 68 is advantageously connected to recirculate to the storage tank 60 but it may also be connected to the cask cavity depending upon the position of the bypass valve 59.

Closed cavity 55 is interposed between the upper and lower closed piping systems and contains a paraboloid-shaped stainless steel screen mesh filter basket 123 that extends from circular edge 125 of the sealing surfaces 28, corresponding to the inverted base of the filter basket 123, to the vertex 127 of the paraboloid screen filter basket 123 resting on plate 71. However, this screen filter basket 123 may also be hemispherical in shape.

In operation a resin-water mixture containing radioactive spent ion-exchange resin is pumped from the storage tank 60 into cavity 55 through bypass valve 59 by pump discharge 68 thereby to fill screen basket 123, while valve 59 selectively bypasses some of this material for recirculation through line 61' to storage tank 60. Vent pipe 51 equalizes the pressure in cavity 55 through filter 53 in a raised containment system closed to the release of liquids or solids. The solids are retained by the basket and the liquid passes through the screen filter basket 123 to the flat plate 71 and thence through return pump 99 and filter 105 to sump tank return 111 through opening 109. The fluids are thus pumped into sump tank return 111 for evaporative reprocessing. When the solids have nearly filled the basket, liquid filling is ceased, and a desiccant is blown into the open spaces 141 and 143 through pipe 57, which has been disconnected from valve 59, and through the coupling at the bottom of the cask to absorb residual moisture in cask 11 so as to provide only solid material therein. The filler plug is replaced by a solid lead plug encased in high strength steel to maintain plug integrity in the event of transportation accident and resulting "standard fire." A pipe plug closes the remaining cask opening, by threading into the coupling 81 at the bottom of the cask, and the cask 11 is opened and the full basket 123 is removed and buried. The cask 11 is decontaminated, a new basket returned to the reactor site for reuse and for the beginning of a new cycle as described above.

In one actual embodiment, the cask 11 of this invention has been assigned a Bureau of Explosives Permit and authorized to contain 54 curies of corrosion and fission products. This cask 11, also meets ICC regulations and the requirements of 10 CFR 20.

This invention has the advantage of providing a lightweight, compact, high capacity practical and economical system for transporting radioactive wastes from nuclear reactors. The cask and method of this invention substantially removes or eliminates the radiation safety hazards and losses known heretofore, such as from splashing and airborne solids, since the system is essentially closed to gas, liquid or solid loss during loading and shipping. This invention also eliminates costly expensive and time-consuming mixing, such as with concrete or as a liquid for shipping. Additionally, the cask of this invention is reusable.

What is claimed is:
1. The method of preparing a package of low level radioactive waste for shipment, comprising the steps of:
  (a) injecting a radioactive liquid-solid resin mixture into a cask adapted to contain radionuclide material for shipment therein;
  (b) partially drying the solid material in said mixture by drawing said liquid through a stainless steel, paraboloid-shaped, screen mesh filter under suction pressure to form a mound-shaped residue containing radioactive material partially filling said cask;
  (c) and finishing drying said residue with a desiccant that under and overlies said residue and fills said cask after said residue is partially dried by said filter.

2. The method of preparing a package of low level radioactive waste for shipment, comprising the steps of:
  (a) connecting to an inlet in a shipping cask for radioactive materials a first substantially closed means for circulating a solid-liquid mixture of water, solid ion-exchange resin, solid radioactive waste, and other solids from a nuclear reactor for partially filling the inside of the cask with said radioactive waste;
  (b) partially filling said cask with said mixture and partially drying said solids and radioactive waste in said cask by drawing said liquid from said mixture through a paraboloid-shaped filter screen in said cask under suction pressure applied to an outlet in said cask to produce a radioactive, solid material containing residue partially filling said filter in the form of a mound at the center of the cask;
  (c) disconnecting from said outlet in said cask said suction pressure;
  (d) injecting desiccant into said cask through said outlet to underlay said residue therewith and to form a paraboloid-shaped interface with said filter;
  (e) disconnecting said first means from said inlet;
  (f) injecting desiccant into said cask through said inlet to overlie said residue therewith whereby said underlying and overlying desiccant fill the portion of said cask remaining unfilled after said residue is partially filled in said cask;
  (g) said cask being vented through an opening in the top of said cask having positive filter means external to said cask and positively connected with the interior thereof during said filling of said cask; and
  (h) closing the openings in said cask with solid plugs to maintain plug integrity in the event of a transportation accident whereby said fully filled cask can be safely shipped with solid material fully filled therein and the handling of said solid material and radiation exposure to personnel therefrom are minimized.

3. The method of preparing a package of low level, solid, radioactive, waste for shipment, comprising the steps of:
  (a) circulating in a first, substantially closed system connected with a storage tank, a mixture of water and ion-exchange resin containing radioactive waste and solids from a nuclear reactor;
  (b) bypassing a portion of said circulating mixture in a stream along an axis vertically downwardly;
  (c) partially drying said radioactive waste and solids in said stream by directing the stream toward the bottom of a paraboloid-shaped screen filter whereby said filter is partially filled with said waste and solids in the form of a residue and a portion of said water in said stream passes through said filter;
  (d) shielding said residue with a steel lined, steel encased, high density concrete shipping cask formed with a cylindrical bore closed by a flat top and bottom having parallel sides completely enclosing said filter except for an inlet for said stream and a vent at the top thereof and an outlet at the bottom thereof for said water passing through said filter;
(e) circulating said water passing through said outlet in a second closed system under pressure from said outlet through a glass pipe, a pump, a valve, and a filter to a sump;
(f) tilting said cask to drain water from said residue through said outlet and said water passing through said screen filter through said outlet;
(g) opening said inlet and outlet by disconnecting said first and second closed systems therefrom;
(h) venting said cask seriatim from said vent through a first shutoff valve, an expansion tank, a second shutoff valve, a filter, and a pipe having a serpentine-shaped extension;
(i) injecting desiccant through said inlet and outlet to overlie said residue and to underlie said screen filter whereby said desiccant forms a first interface with the top of said residue and a second interface with the bottom of said filter to finish drying said resdue and to fill said cask with solid material; and
(j) closing said inlet, vent and outlet with solid plugs for shipping said cask with said radioactive waste material therein.

References Cited

UNITED STATES PATENTS

| | | | |
|---|---|---|---|
| 622,217 | 4/1899 | Fuller et al. | 210—499 |
| 2,017,277 | 10/1935 | Gatewood | 210—454 |
| 2,409,928 | 10/1946 | Cahenzli | 210—266 X |
| 2,708,656 | 5/1955 | Fermi et al. | 220—10 X |
| 2,892,679 | 6/1959 | Fuentevilla | 252—301.1 X |
| 3,196,106 | 7/1965 | Haden et al. | 210—38 X |
| 3,205,588 | 9/1965 | Oetjen et al. | 252—301.1 X |

J. L. DE CESARE, *Primary Examiner.*

U.S. Cl. X.R.

210—416, 436, 452, 499